United States Patent [19]

Yamada

[11] Patent Number: 4,990,574

[45] Date of Patent: Feb. 5, 1991

[54] PROCESS FOR PRODUCTION OF MODIFIED RESIN

[75] Inventor: Mikio Yamada, Kobe, Japan

[73] Assignee: Sumitomo Rubber Industries, Ltd., Hyogo, Japan

[21] Appl. No.: 318,014

[22] Filed: Mar. 2, 1989

[30] Foreign Application Priority Data

Mar. 2, 1988 [JP] Japan ................................. 63-48960

[51] Int. Cl.$^5$ ............................................. C08F 8/42
[52] U.S. Cl. .................................. 525/371; 525/330.2; 525/363; 525/367; 525/368; 525/369
[58] Field of Search ............... 525/363, 367, 368, 369, 525/371

[56] References Cited

U.S. PATENT DOCUMENTS

| | | | |
|---|---|---|---|
| 3,322,734 | 5/1967 | Rees | 525/371 |
| 3,454,676 | 7/1969 | Busse | 525/371 |
| 3,649,578 | 3/1972 | Bush et al. | 525/371 |
| 4,526,375 | 7/1985 | Nukade | 525/221 |

Primary Examiner—Bernard Lipman
Attorney, Agent, or Firm—Birch, Stewart, Kolasch & Birch

[57] ABSTRACT

The present invention provides an ionomer resin having desired properties which is free from the above drawbacks and can readily react in an extruder. That is, the present invention provides a process for producing a modified ionomer resin which comprises mixing ionomer resin wherein 10-60% of the total carboxylic acid moieties are neutralized with sodium ions with basic zinc carbonate under molten conditions to further neutralize 10-40% of the total carboxylic acid moieties with zinc ions.

2 Claims, 1 Drawing Sheet

PROCESS FOR PRODUCTION OF MODIFIED RESIN

FIELD OF THE INVENTION

The present invention relates to modification of sodium-neutralized type ionomer resin using zinc ion.

BACKGROUND OF THE INVENTION

Ionomer resins are resins having good toughness, sold under the trade name of Surlyn or Hi-miran, and used for cover of golf ball and the like. The resins contain free carboxylic acid moieties and, in the generally marketed resins, at least a part of such acid moieties are neutralized with metal ion. For example, in sodium neutralized type ionomer resins, 10–60% of the total carboxylic acid moieties are neutralized with sodium ion and the rest remains not neutralized.

Among ionomer resins, sodium neutralized type resins have excellent impact resilience but poor low-temperature durability, therefore, for example, there is the possibility of crack and the like at the temperature lower than −5° C.

To correct this defect, it is proposed that the sodium neutralized type ionomer resin is blended with a zinc neutralized type ionomer resin which has good durability at a low temperature. However, according to this blending method, fatigue failure upon repeated impacts may be accelerated. Moreover, the resins which can be mixed are limited to the zinc neutralized type ionomer resins, resulting in drawbacks, for example, limited freedom of design.

To avoid the problem caused by such blending methods, metal oxide is proposed to be compounded in sodium neutralized type ionomer resin to allow to react the residual free carboxylic acid moieties in the ionomer resin with desired metal (see, U.S. Patent Ser. Nos. 4526375 and 662322 and PCT Application No. 8702039).

However, the above process is disadvantageous because reactivity is insufficient to carry out mixing and reacting in an extruder.

SUMMARY OF THE INVENTION

The present invention provides an ionomer resin having desired properties which is free from the above drawbacks and can readily react in an extruder. That is, the present invention provides a process for producing a modified ionomer resin which comprises mixing ionomer resin wherein 10–60 % of the total carboxylic acid moieties are neutralized with sodium ions (hereinafter referred to as "sodium neutralized type ionomer resin") with basic zinc carbonate under molten conditions to further neutralize 10–40% of the total carboxylic acid moieties with zinc ions.

DETAILED DESCRIPTION OF THE INVENTION

The sodium neutralized type ionomer resin used in the present invention means thermoplastic resin which is prepared by synthesizing a polymer of monoolefin with at least one selected from a group consisting of $C_{3-8}$ unsaturated mono- or dicarboxylic acid or ester thereof (containing 4–30 wt% of unsaturated or mono- or dicarboxylic acid and/or ester thereof), followed by neutralizing with sodium ions. Such ionomer resin includes various kinds of Hi-miran, for example, 1601, 1605, 1707 and the like, sold by Mitsui Du-Pont Polychemicals.

The ionomer resin of the present invention can be obtained by mixing the sodium neutralized ionomer resin with basic zinc carbonate under melting conditions, usually at 120–300° C.

For neutralization, various kinds of conventionally known methods can be employed. Among them, mixing by an extruder is preferred. The neutralization of free carboxylic acid with zinc ion according to the present invention cam be confirmed according to the infrared spectra (film) of the reaction product, that is, the absorptions of —COOH of the starting ionomer at 1,690–1,700 cm$^{-1}$ are reduced and the absorptions of —COOM (M=Na, Zn) at 1,530–1,600 cm$^{-1}$ are enhanced, and further the characteristic absorption peak of —COOZn at 1,560 cm-1 is newly observed. When the neutralization reaction is completed, the resin which had been cloudy when unreacted becomes transparent and the melt index thereof is reduced. Further, Zn ions are found to be uniformly dispersed using X-ray microanalyzer.

The process of the present invention specifically uses basic zinc carbonate. The reactivity of carboxylic acid moieties in ionomer resins with zinc compounds in an extruder is different to actually determine, but is estimated, to some extent, from the reaction rate of a carboxylic acid compounds with zinc compounds. According to the reaction rate of methacrylic acid with zinc compound at room temperature, the reactivity was as follows: zinc oxide $\gg$ zinc hydroxide $\geqq$ basic zinc carbonate. Based on this fact, zinc oxide has been studied until now in the reaction of the ionomer resin with unneutralized carboxylic acid (see, U.S. Patent Ser. Nos. 4526375 and 662322). Actually, however, when zinc oxide which has the greatest reactivity is used for reaction in an extruder, the reaction rate is not sufficiently fast. Accordingly, zinc oxide is not completely incorporated into the resin as ionized form and remains as a filler. Thus, it is difficult to obtain substantially transparent resin. As the result of our studying a process to improve reactivity, it has surprisingly been found that basic zinc carbonate which is considered to show low reactivity is used to readily and uniformly react in an extruder. Based on this face, pellet of the modified ionomer resin of the present invention can be readily produced in an extruder by combining basic zinc carbonate with the sodium neutralized type ionomer resin.

The amount of basic carbonate added is only 1–3 parts based on 100 parts of ionomer resin. The compound containing zinc added may be in such an amount to neutralize the unneutralized carboxylic acid moieties in the sodium neutralized type ionomer resin, that is, to neutralize 10–40% of the total carboxylic acid moieties.

In the process of the present invention, a zinc salt of volatile organic acid may be mixed in addition to basic zinc carbonate. These salts enhance dispersibility of reagents or serve as catalysts. Preferable salt of volatile organic acid includes, for example, zinc formate, zinc acetate, zinc stearate, zinc propionate or the like. The amount of such salt added is preferably 0.01–0.1 parts by weight per 100 parts by weight of the sodium neutralized type ionomer resin.

In addition to the above compounds, various additives, for example, pigments, lubricants and dispersants (e.g., calcium stearate), antioxidants, stabilizers, ultraviolet absorber, antistatic agents and the like may be added in the process of the present invention.

Basic zinc carbonate and volatile organic acid salts thereof may be mixed with a part of sodium neutralized type ionomer resin to form masterbatch. Formation of masterbatch is preferable because it facilitates mixing in an extruder.

The ionomer resin obtained as described above is extremely suitable as a resin of various sporting goods.

For example, when it is used as a cover resin of a core of a golf ball, the core is covered with two sheets of the above resin which had been processed into semi-spherical sheet, and hot and press molded. Alternatively, the composition for cover may be injection molded to cover the core.

The process for production of the modified ionomer resin of the present invention may be readily carried out in an extruder. The golf ball covered with the obtained resin shows high impact resilience and is extremely excellent in low-temperature durability, that is, it may not crack at the temperature of $-30°$ C. It has excellent durability and resistance to cutting.

EXAMPLES

The present invention will be further illustrated in the follow examples.

COMPARATIVE EXAMPLES 1

Fine particles of zinc oxide (1.0 part) an Hi-miran 1605 (sold by Mitsui Du Pont Polychemicals) were dry-blended in a tumbler at room temperature for 30 minutes. Subsequently, this mixture was supplied to a biaxial extruder. The conditions of an extruder were as follows:

| Screw speed: | | | 200 rpm | | |
|---|---|---|---|---|---|
| Screw diameter: | | | 45 mm | | |
| L/D: | | | 33.5 | | |
| Extruder output: | | | 40 kg/hr | | |
| Cylinder temperature (°C.): | 1 | 2 | 3 | 4 | 5 |
| | 180 | 200 | 200 | 220 | 250 |
| | 6 | 7 | 8 | dice | |
| | 250 | 250 | 250 | 250 | |

The resin after extrusion was opaque and melt index measured at 190° C. was as follows:

| Materials | MI |
|---|---|
| Hi-miran 1605 before extrusion (made by Mitsui Du Pont Polychemicals) | 2.8 |
| Hi-miran 1605 after extrusion (made by Mitsui Du Pont Polychemicals) | 2.6 |

MI value was slightly reduced. Thus, it was supposed that reaction has taken place. This material was used to cover a solid core according to the conventional method and resistance to impact at $-30°$ C. was determined. As the result, the covers using both materials cracked after several tests. That is, they are not suitable for practical applications.

COMPARATIVE EXAMPLES 2

In the same manner as that in Reference Example 1, except that zinc oxide was substituted with zinc hydroxide, composition for cover was obtained and evaluated as a ball. This composition also had low resistance to impact at low temperature.

EXAMPLE 1

Basic zinc carbonate (1.5 parts) and Hi-miran 1605 (100 parts) were blended in the same manner as that in Reference Example 1, and supplied to an extruder. As for the conditions of an extruder, L/D was reduced compared with that in Reference Example 1 so that reaction may proceed faster and unnecessary heat history can be avoided.

| Screw speed: | | | 200 rpm | | |
|---|---|---|---|---|---|
| Screw diameter: | | | 45 mm | | |
| L/D: | | | 30 | | |
| Extruder output: | | | about 40 kg/hr | | |
| Cylinder temperature (°C.): | 1 | 2 | 3 | 4 | 5 |
| | 35 | 120 | 180 | 220 | 240 |
| | 6 | 7 | 8 | dice | |
| | 260 | 260 | 260 | 260 | |

The resin after extrusion was transparent and melt index was as follows:

| Materials | MI |
|---|---|
| Before extrusion | 2.8 |
| After extrusion | 1.2 |

As confirmed by the above infrared absorption spectra, zinc ion is considered to be added to the unneutralized carboxylic acid in Hi-miran 1605 (neutralized with sodium), resulting in reduced melt index. Using this material, solid core was covered in the same manner as that in Reference Example 1, and resistance to impact at $-30°$ C. was examined. As the result, all resins before reaction cracked before hitting five times, while the resins after reaction never cracked after hitting 50 times.

EXAMPLE 2

Example 1 was repeated wherein basic zinc carbonate (1.5 parts by weight) was substituted with basic zinc carbonate (1.4 parts by weight), zinc stearate (0.1 parts by weight), zinc acetate (0.1 parts by weight) and added to Hi-miran 1605 (100 parts by weight) and dry-blended in a tumbler at room temperature for 30 minutes. Subsequently, this mixture was supplied to a biaxial extruder. The conditions for the extruder were as follows. Cylinder temperature was the same as that in Example 1.

| Screw speed: | 200 rpm |
|---|---|
| Screw diameter: | 45 mm |
| L/D: | 30 |
| Extruder output: | about 40 kg/hr |

The resin obtained under these conditions was compared with resins of the following Reference Example 3 and the like. IR spectra of the resin of this example and Hi-miran 1605 are shown in FIG. 1.

REFERENCE EXAMPLE 3

Zinc oxide in Reference Example 1 was substituted with magnesium hydroxide (0.75 parts by weight) and magnesium was added under the same extrusion conditions in Example 2 and neutralization was conducted.

To compare the properties of the resin of Example 2 with resins of Reference Example 3 and the like, balls were formed in the same manner as that in Example. The results are shown in Table 1.

TABLE 1

|  | Ex. 1 | Ref. Ex. 3 | Ref. Ex. 4 | Ref. Ex. 5 | Ref. Ex. 6 |
| --- | --- | --- | --- | --- | --- |
| Composition of Cover Resin | Described Above | Described Above | Hi-miran 1706 | Hi-miran 1605 | H-miran 1605/1706 = 70/30 |
| Neutralizing Ion | Zn, Na | Na, Mg | Zn | Na | Na, Zn |
| Weight of Ball | 45.1 | 45.0 | 45.2 | 45.0 | 45.1 |
| Compression | 100 | 100 | 100 | 100 | 100 |
| Initial Velocity of Ball (m/s) | 65.2 | 64.8 | 64.3 | 65.0 | 64.9 |
| Low Temperature Durability[1] | Not cracked | Not cracked | Not cracked | All cracked before test repeated 5 times | Not cracked |

Notes:
All reagents (i.e., basic zinc carbonate, zinc stearate, zinc acetate, zinc oxide, magnesium hydroxide and zinc hydroxide) are sold by Yoneyama Yakuhin Shiyaku K.K.
[1]The sample which had been cooled at −30° C. for 12 hours was crashed with iron plate five times at the rate of 45 m/sec. and this test was repeated with 12 falls.

The table shows that sodium neutralized type ionomer resin has high impact resilience but bad low-temperature durability. Accordingly, it is not practical. Sodium neutralized type ionomer resin may be blended with zinc neutralized type ionomer resin to improve low-temperature durability. However, as for initial velocity of the ball which directly relates to the flying ability of the ball, the properties of the sodium neutralized type ionomer resin is deteriorated by the zinc neutralized type ionomer resin. Thus, this process may not essentially recommended. There are several novel techniques to satisfy both requirements by neutralization with magnesium and sodium, however, they have drawbacks in reactivity and are not practical. The sodium, zinc neutralized type ionomer resin according to the present invention shows good low-temperature durability as well as good initial velocity of the ball. That is, in the conventional techniques wherein the above sodium neutralized type ionomer resin is blended with zinc neutralized type ionomer resin, the composition for the cover is a mixture of the different types of ionomer resins wherein sodium neutralized type resin and zinc neutralized type resin independently exist. On the contrary, in the present invention, the ionomer resin contains dissimilar metal ions in a single molecule (dual ion) and it is supposed to have high impact resilience which the parent sodium neutralized type ionomer resin has.

Figure 1:
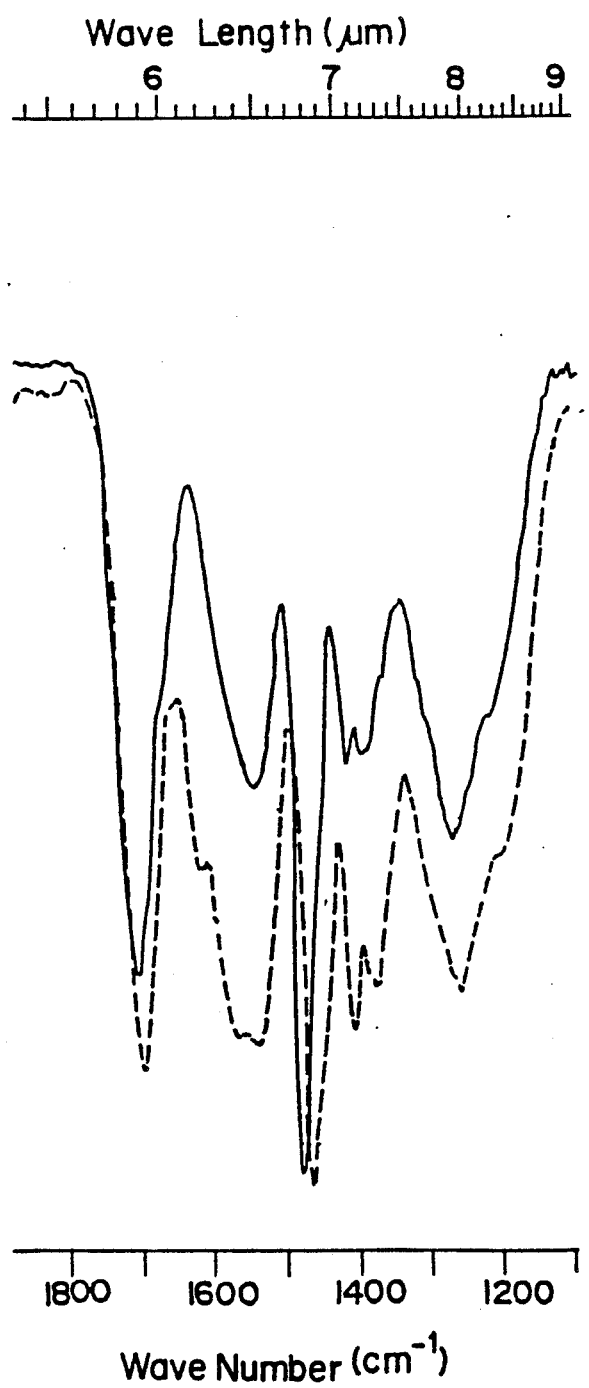
FIG. 1 shows IR (infrared absorption spectra) chart of zinc added type ionomer resin (Hi-miran 1605, modified) (dotted line) and commercially available ionomer resin (Hi-miran 1605) (solid line).

What is claimed is:
 1. A process for producing a modified ionomer resin which comprises mixing ionomer resin, wherein 10–60 % of the whole carboxylic acid moieties are neutralized with sodium ions, with basic zinc carbonate under melting conditions to further neutralize 10–40 % of the whole carboxylic acid moieties with zinc ions.
 2. The process according to claim 1, wherein carboxylic acid in the ionomer resin is 10–20 wt%.

* * * * *